(12) United States Patent
Albertelli (10) Patent No.: US 11,449,027 B2
(45) Date of Patent: Sep. 20, 2022

(54) METHOD AND A SYSTEM FOR REDUCING VIBRATIONS IN A MECHANICAL PROCESSING FOR REMOVAL OF CHIPPINGS

(71) Applicant: MANDELLI SISTEMI S.P.A., Piacenza (IT)

(72) Inventor: Paolo Albertelli, Piacenza (IT)

(73) Assignee: MANDELLI SRL, Piacenza (IT)

( * ) Notice: Subject to any disclaimer, the term of this patent is extended or adjusted under 35 U.S.C. 154(b) by 178 days.

(21) Appl. No.: 16/771,598

(22) PCT Filed: Dec. 7, 2018

(86) PCT No.: PCT/IB2018/059765
§ 371 (c)(1),
(2) Date: Jun. 10, 2020

(87) PCT Pub. No.: WO2019/116185
PCT Pub. Date: Jun. 20, 2019

(65) Prior Publication Data
US 2020/0301390 A1 Sep. 24, 2020

(30) Foreign Application Priority Data
Dec. 12, 2017 (IT) .................. 102017000143001

(51) Int. Cl.
*G05B 19/19* (2006.01)
*G05B 19/18* (2006.01)
*G05B 19/414* (2006.01)

(52) U.S. Cl.
CPC ........... *G05B 19/19* (2013.01); *G05B 19/182* (2013.01); *G05B 19/414* (2013.01); *G05B 2219/37346* (2013.01); *G05B 2219/37351* (2013.01)

(58) Field of Classification Search
CPC .... G05B 19/19; G05B 19/182; G05B 19/414; G05B 2219/37346; G05B 2219/37351; G05B 2219/41229
See application file for complete search history.

(56) References Cited

U.S. PATENT DOCUMENTS

| | | | | |
|---|---|---|---|---|
| 3,744,353 A | * | 7/1973 | Rohs ................. | B23Q 17/0976 82/904 |
| 2010/0010662 A1 | * | 1/2010 | Inagaki .............. | B23Q 11/0039 700/175 |

(Continued)

FOREIGN PATENT DOCUMENTS

| | | |
|---|---|---|
| EP | 2614922 A1 | 7/2013 |
| WO | 2014064953 A1 | 5/2014 |

OTHER PUBLICATIONS

Xilin Fu, Shasha Zheng, New approach in dynamics of regenerative chatter research of turning, Communications in Nonlinear Science and Numerical Simulation, vol. 19, Issue 11, 2014, pp. 4013-4023. (Year: 2014).*

(Continued)

*Primary Examiner* — Christopher E. Everett
(74) *Attorney, Agent, or Firm* — Shuttleworth & Ingersoll, PLC; Timothy Klima (57) ABSTRACT

A method for reducing vibrations originating in a mechanical processing for removal of swarf comprising monitoring the vibration resulting from contact between the tool and workpiece, detecting the occurrence of a regenerative vibratory phenomenon, calculating the frequency of the phenomenon, estimating a value representing a resonance frequency of the machine as a function of the frequency of the phenomenon and determining a threshold value on the basis of the value. Also, comparing the operating speed of the mandrel with the threshold value and reducing the intensity of the phenomenon by a first reduction strategy based on (Continued)

correction of the operating speed of the mandrel being greater than the threshold value or by a second reduction strategy based on a continuous modulation which imparts an oscillation to the speed around the value of the operating speed, when the operating speed of the mandrel is less than the threshold value.

18 Claims, 2 Drawing Sheets

(56) References Cited

U.S. PATENT DOCUMENTS

| | | | |
|---|---|---|---|
| 2012/0101624 A1* | 4/2012 | Ueno | B23Q 17/0976 |
| | | | 700/173 |
| 2017/0153208 A1* | 6/2017 | Kawai | B23Q 17/0971 |
| 2018/0036851 A1* | 2/2018 | Rattunde | B23B 5/167 |

OTHER PUBLICATIONS

M. Siddhpura, R. Paurobally, A review of chatter vibration research in turning, International Journal of Machine Tools and Manufacture, vol. 61, 2012, pp. 27-47. (Year: 2012).*

International Search Report and Written Opinion dated Mar. 18, 2019 for counterpart International Patent Application No. PCT/IB2018/059765.

* cited by examiner

METHOD AND A SYSTEM FOR REDUCING VIBRATIONS IN A MECHANICAL PROCESSING FOR REMOVAL OF CHIPPINGS

This application is the National Phase of International Application PCT/IB2018/059765 filed Dec. 7, 2018 which designated the U.S.

This application claims priority to Italian Patent Application No. 102017000143001 filed Dec. 12, 2017, which application is incorporated by reference herein.

TECHNICAL FIELD

This invention relates to a method and a system for reducing vibrations in a mechanical processing for removal of chippings.

BACKGROUND ART

More specifically, the invention relates to a method and a system for reducing regenerative instability phenomena, commonly known as regenerative chatter, originating from the dynamic interaction between a workpiece being processed and a machine tool, such as, for example, a milling machine.

The regenerative chatter phenomenon has been known for some time in the sector for the removal of chippings and, even though it has been dealt with to a certain extent, it is still currently difficult to resolve.

"Dedicated" systems have in fact been known in the prior at for some time which are able to act on the operating parameters of the machine tool when the occurrence of a unstable vibratory phenomenon is identified upon contact between the tool and workpiece.

In fact, the literature teaches how it is possible to treat these phenomena by means of two different strategies, usually alternative to each other, for reducing vibrations, both focussed on the variation of the operating speed in the search for a value or condition which stabilises the processing.

From the point of view of the phenomenon, the teaching of the theoretical prior art is to analyse the behaviour of the machine during the performance of a specific processing by means of the trend of what is commonly called the "lobe diagram", representing the lobed curve which ideally identifies a stable region, characterised by the stable processing, with respect to one in which unstable processing is associated as a function of both the speed of rotation of the mandrel (X-axis) and the depth of the pass (Y-axis).

Having the lobe diagram, estimated on the basis of the dynamic characteristics of the machine and the processing, it is possible to make a first approximation of the processing condition at the moment of the occurrence of the chatter, consequently re-modulating the speed according to a pre-determined reduction strategy.

Disadvantageously, all the prior art methods and devices have concrete limits of industrial applicability and effectiveness.

In fact, the need of the majority of methods, according to which it is necessary to experimentally reconstruct the trend of the lobe diagram, makes it impossible to create a universal system and requires extremely long analysis times of the machine, also resulting in a method which is very rigid and applicable only to the processing analysed.

Moreover, the setting of a predetermined reduction strategy, which does not considered the actual "status" of the machine, does not allow the effectiveness of the reduction procedure to be optimized.

DISCLOSURE OF THE INVENTION

The aim of this invention is to provide a method and a system for reducing vibrations originating in a mechanical processing for the removal of chippings which can overcome the above-mentioned drawbacks of the prior art.

More specifically, the aim of the invention is to provide a method and a system for reducing vibrations in a mechanical processing for the removal of chippings which is particularly robust and efficient.

More specifically, the aim of this invention is to provide a method and a system for reducing vibrations in a mechanical processing for the removal of chippings which is easy to set up and install.

These aims are achieved by a method for reducing vibrations in a mechanical processing for the removal of chippings having technical features as disclosed herein, as well as by a system for reducing vibrations in a mechanical processing for the removal of chippings having features as disclosed herein.

The method for reducing vibrations is, as mentioned, used during a processing for the removal of chippings, preferably milling, carried out by a machine tool having a mandrel rotating at a relative operating speed on which is mounted a predetermined tool equipped with one or more cutting tools (defining a plurality of frequencies which are characteristic of the process).

The method comprises monitoring the vibration which arises from the contact between the tool and a workpiece being processed (that is to say, the vibrations originating during the processing) and detecting the occurrence of a regenerative vibratory phenomenon.

Preferably, the detection of the vibratory regenerative phenomenon is performed by measuring, in the vibration, a frequency content which is not correlated (not associated) with the characteristic frequencies of the process (predetermined as a function of the structure of the machine and the processing).

Alternatively, the detection may comprise a comparison of the vibration detected with a pre-set limit value, which, when it is exceeded, identifies the occurrence of the by regenerative vibratory phenomenon.

Preferably, the assessment of the intensity of the vibration is performed in frequency terms, that is to say, by analysing the frequency spectrum of the vibration signal (analysing the vibration signal in the frequency domain).

Preferably, in fact, the frequency (main) of the vibratory phenomenon is calculated.

A value representing a resonance frequency is preferably estimated on the basis of the frequency value (main) of the vibratory phenomenon.

At least one threshold value is subsequently (or simultaneously) determined on the basis of the value representing a resonance frequency.

The threshold value is preferably a value comparable with the operating speed (i.e. rotation of the mandrel)

In this the regard, the method comprises comparing the real-time value of the operating speed of the mandrel with the threshold value.

According to an aspect of this invention, the method then comprises reducing the intensity of the vibratory phenomenon by the performance of a first reduction strategy SST or a second reduction strategy SSV as a function of the result of comparison.

Preferably, the method comprises performing the first control strategy, based on a correction of the operating speed when the operating speed of the mandrel is greater than the threshold value.

In accordance with this, the method comprises performing a second reduction strategy SSV, based on a continuous modulation which imparts an oscillation to the speed around the value of the operating speed when the operating speed is less than the threshold value.

Advantageously, in this way the system is robust and able to adapt to the individual characteristics of the processing and of the machine, thus being particularly efficient.

Preferably, the determination of the threshold value comprises calculating a stable operating speed as a function of the resonance frequency of the machine.

More preferably, the stable operating speed correspond to that of the first stability lobe of the lobe diagram (i.e. maximum speed) and is calculated as a function of the resonance frequency.

According to a preferential aspect of the invention, the value representing the resonance frequency of the machine corresponds to the measured frequency of the vibratory phenomenon, which clearly considerably simplifies the determination of the above-mentioned stable operating speed.

Preferably, moreover, the stable operating speed is then divided by a predetermined number, preferably whole and more preferably equal to five, in order to calculate the threshold value.

Advantageously, in this way the threshold value divides the range of operating speeds of the machine into at least a first range, which corresponds to low operating speeds, and at least a second range, which corresponds to high operating speeds.

Therefore, advantageously, according to this aspect of this invention, the method allows the machine to autonomously distinguish the ideal type of intervention (i.e. reduction strategy) as a function of the operating speed of the machine.

This invention also relates to a system for reducing vibrations which, preferably, operates according to the method which is also the object of the invention.

The system comprises:
sensor means configured for monitoring the vibration which arises from the contact between the tool and a workpiece being processed and providing a signal representing the vibration,
an interface designed to be placed in communication with a control unit of the machine tool,
a processing unit associated with the sensor means and the interface to exchange signals with it.

According to a first aspect of the invention, the processing unit is configured to compare the signal representing the vibration with one or more pre-set reference parameters;
activating a method of reducing the vibrations if the signal (S1) representing the vibration exceeds one or more pre-set reference parameters—activating a method of reducing the vibrations if the signal representing the vibration exceeds (or diverges from) the one or more pre-set reference parameters.

It should be noted that the reference parameters may be defined by the characteristics frequencies (already mentioned above) or, alternatively, one or more limit values (or thresholds).

Preferably, the method for reducing vibrations comprises:
calculating the frequency of the vibratory phenomenon;
estimating a value representing a resonance frequency of the machine as a function of the frequency of the vibratory phenomenon;
determining at least one threshold value on the basis of the value representing a resonance frequency;
comparing a real-time value of the operating speed of the mandrel (or tool) with the threshold value;
adopting a first reduction strategy (SST) or a second reduction strategy (SSV) according to the result of the comparison.

The first and second reduction strategies are similar to those described above.

The first reduction strategy SST comprises a correction of the operating speed, increasing or decreasing, and is actuated by the processing unit when the real-time value of the operating speed of the tool (or of the mandrel) exceeds the threshold value.

The second reduction strategy SSV is on the other hand based on a continuous modulation which imparts an oscillation to the operating speed around the real-time value of the operating speed and is actuated by the processing unit when the real-time value of the operating speed of the mandrel (or of the tool) is less than the threshold value.

Preferably, the processing unit is configured to perform both the first and the second reduction strategy in an iterative fashion for a predetermined number of cycles/iterations.

After exceeding the predetermined number, the processing unit is preferably configured to stop the adopted reduction strategy.

More specifically, the term "stop" means that the parameters of the strategy are fixed to the last values available or to the values for which the lowest intensity of the vibration has been detected.

In this regard, so as to speed up the convergence of the strategy to a stable speed value, the system preferably comprises a user interface module associated with the processing unit and configured to allow the user to set the parameters for controlling the first and second reduction strategy according to the particular needs.

For example, in effect, as a function of the type of processing or of the type of material processed, the user can set up the parameters for controlling the strategies according to the relative experience in such a way as to maximise the effectiveness, reducing as much as possible the number of iteration necessary to reach the stability.

BRIEF DESCRIPTION OF DRAWINGS

These and other features, as well as the relative advantages, will become more apparent from the following non-limiting description of a preferred non-exclusive embodiment of a method and a system for the reduction of vibrations in a mechanical processing for removal of swarf as illustrated in the accompanying drawings, in which.

DETAILED DESCRIPTION OF PREFERRED EMBODIMENTS OF THE INVENTION

Figure 1:
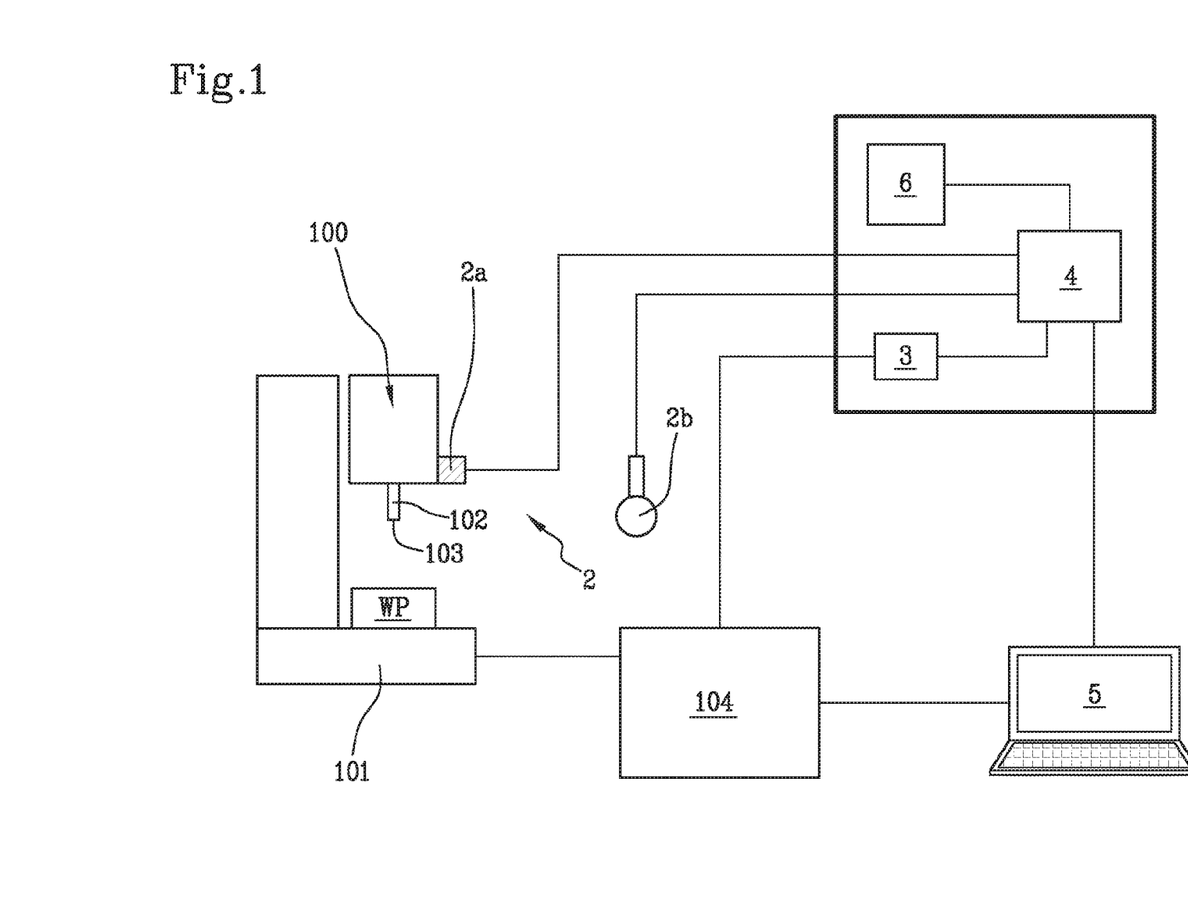
FIG. 1 shows a schematic view of the system for reducing vibrations according to the invention installed on a machine tool.

With reference to the accompanying drawings, the numeral 1 denotes a system for reducing vibrations in a mechanical processing for removal of chippings according to the invention.

The system 1 is applied (applicable) to a machine tool 100, preferably to a milling cutter.

The machine tool 100 generically comprises a part holding device 101, a mandrel 102 rotating at a relative operating speed ωL and movable towards and away from the part holding device 101 according to one or more working axes.

A predetermined tool 103 equipped with one or more cutters is mounted on the mandrel 102, wherein the type and the number of cutters is a function of the processing to be performed.

In order to control the movements of the mandrel relative to the workpiece, and thus determine the processing steps, the machine 100 comprises a control unit 104.

The control unit 104 is configured to receive from suitable sensors the parameters representative of the machine (positions, torques, currents, temperatures, etc.) and to control the movements along the axes, in terms of torque, speed and resulting position and as a function of a predetermined work cycle.

The system 1 is configured to interface with the machine tool 100, or, if necessary, to be integrated with it, in order to actuate a method for reducing vibrations, preferably a method also according to the invention.

The system 1 preferably comprises sensor means 2 configured for monitoring the vibration which arises from the interaction between the tool 103 and a workpiece "WP" being processed.

The sensor means 2 are also prepared for providing a signal "S1" representing the vibration.

Preferably, the sensor means 2 are configured to detect the vibration in accelerometer terms, that is to say, the mechanical oscillation of the tool or the mandrel or the machine, and/or in acoustic terms, that is to say, the generation of a sound wave by the vibrating of the tool or workpiece.

Preferably, the sensor means 2 comprise an accelerometer 2a, to be associated with the mandrel 102 of the machine tool 100 and configured for identifying the vibrations which are transmitted by the tool 103 to the mandrel 102.

Advantageously, this type of sensor is particularly effective in measuring vibrations arising with "squat" tools, which are able to transmit all or part of the vibration to the structure of the machine, in particular to the mandrel 102 and to the machine 100.

Alternatively, or in addition, the sensor means 2 comprise a microphone 2b, preferably a hydrophone, positioned at a predetermined distance from the tool 103 so as to pick up the oscillations of the tool, that is to say, the sound waves generated by the vibration of the tool.

Advantageously, this type of sensor is particularly effective in measuring vibrations arising with "slim" tools, wherein the vibration is transformed mainly into an oscillation of the tool/cutter itself.

According to the preferred embodiment, the sensor means 2 comprise both the accelerometer 2a (or the accelerometers) and the microphone 2b.

The system 1 also comprises an interface 3 (or interface module) designed to be put in communication with the control unit 104 of the machine tool 100.

The interface 3 is configured to exchange signals with the control unit 104, both to receive signals representing the fundamental quantities of the processing (operating speed ωL, working torque, position, etc.) and to send to the control unit 104 signals representing a reduction strategy, specifically a "target" operating speed.

According to the preferred embodiment, the interface 3 is placed in direct communication also with the sensor means 2, in such a way as to receive the signal S1 from them.

The system 1 also comprises a processing unit 4 associated with the sensor means 2 and the interface 3 to exchange signals with it.

Preferably, the processing unit 4 is designed to compare together the signals received from the sensor means 2 and the interface 3 and identify, as a function of the comparison, at least one processing condition started by the machine tool 100.

More precisely, the processing unit 4 is configured to compare together the signals received from the sensor means 2 and/or from the interface 3 with a set of corresponding reference parameters representing at least one operating status of the machine, the operating state corresponding at least with a processing condition.

In other words, the processing unit 4 is programmed to identify the operating status of the machine and in particular at least a single processing condition in which regenerative vibratory phenomena could arise.

However, preferably, the processing unit 4 is configured for identifying a plurality of operating conditions of the machine tool 100, including the above-mentioned processing condition and at least a condition (status) at the entrance of the workpiece.

Moreover, the processing unit 4 is configured to receive the signal "S1" representing the vibration from the sensor means 2 (if necessary, through the interface 3) and is configured to compare the signal with one or more reference parameters.

Preferably, the comparison is performed in the range of the frequencies.

For this reason, the processing unit 4 is preferably configured to transform the signal "S1" representing the vibration, acquired in a time domain, into a frequency domain (for example, Fourier transform), identifying the frequencies in play.

When the processing unit 4 detects that the processing frequencies are uncorrelated (or not associated) with the characteristic frequencies of the process (predetermined), then it measures the occurrence of a regenerative vibratory phenomenon.

Alternatively, however, the processing unit could carry out the comparison in the time domain, identifying the maximum values of the vibration signal as a value representing the oscillation amplitude.

According to this embodiment, the occurrence of the regenerative vibratory phenomenon is detected when the intensity of the vibration (in terms of energy or amplitude) exceeds a pre-set limit value.

Advantageously, considering the fact that the presence of a regenerative chatter results in high surface defects on the workpiece and/or damage to the equipment, when the regenerative vibratory phenomenon is detected the processing unit 4 is configured to activate a method for reducing the vibration.

It should be noted that, preferably, the processing unit is configured to activate the method for reducing the vibration only when the started processing condition is identified.

In the vibration reduction mode, the processing unit 4 is configured for identifying (or calculating the frequency of the vibratory phenomenon (fC) the frequency of the vibratory phenomenon $f_C$ detected.

The frequency may already have been identified in the comparing step or be calculated during this step.

In any case, the frequency of the vibratory phenomenon fC is preferably calculated by transforming the vibration signals in the frequency domain and identifying the frequency value for which there are the greatest amplitudes.

Moreover, the processing unit 4 is also configured for estimating a value representing a resonance frequency $f_R$ of the machine 100 as a function of the frequency of the vibratory phenomenon $f_C$.

Preferably, the processing unit 4 is programmed to attribute to the resonance frequency $f_R$ the value of the frequency of the vibratory phenomenon $f_C$. In other words, the resonance frequency $f_R$ of the machine is considered to be the vibrating frequency $f_C$.

Preferably, also, on the basis of the resonance frequency $f_R$ or the vibratory phenomenon frequency $f_C$, at least one operating speed threshold value $\omega_{TR}$ is determined.

More specifically, the processing unit 4 is preferably configured to identify a hypothetical stable speed $\omega_{max}$ as a function of the value of the resonance frequency $f_R$ (or the frequency of the vibratory phenomenon $f_C$).

The stable speed $\omega_{max}$ is preferably to be considered a hypothetical maximum stable speed, corresponding to the chatter theory at the stable speed located at the first stability pocket which can be identified in the processing stability diagram.

The methods for construction and identification of this diagram is known and can be found, for example, in "Altintş, Y. & Budak, E., 1995. *Analytical Prediction of Stability Lobes in Milling. CIRP Annals—Manufacturing Technology*, 44(1), pp. 357-362".

According to the preferred embodiment, the stable speed $\omega_{max}$ is calculated using the following formula:

$$\omega_{max} = \frac{f_R \times 60}{n}$$

wherein:
$\omega_{max}$ is the (maximum) stable speed
$f_R$ is the estimated resonance frequency
$n$ is equal to the number of cutters of the tool According to one aspect of the invention, the processing unit 4 is configured for calculating the threshold value $\omega_{TR}$ mentioned above as a fraction (whole or not) of the stable speed $\omega_{max}$.

Preferably, the processing unit 4 is configured for calculating the threshold value $\omega_{TR}$ by dividing the stable speed $\omega_{max}$ by a number between 3 and 10, preferably between 4 and 6, more preferably equal to 5.

The processing unit 4 now compares a real-time value of the operating speed $\omega_L$) of the mandrel (that is, of the tool) with the threshold value $\omega_{TR}$ of the speed. It should be noted that, preferably, the real-time value of the operating speed $\omega_L$ is provided to the processing unit, through the interface 3 (or interface module) by the control unit 104 of the machine tool 100.

It should be noted that the term "real-time value" means identifying the value of the operating speed $\omega_L$ at the time of measuring and, preferably, at the time of detecting the occurrence of the chatter.

According to a main aspect of this invention, the processing unit 4 is configured to select the strategy for reducing the vibratory phenomenon detected (i.e. regenerative chatter) as a function of the result of the comparison.

Preferably, the processing unit 4, in the reduction mode, is configured to adopt a first reduction strategy (SST) when the real-time value of the operating speed $\omega_L$ is greater than the threshold value $\omega_{TR}$ and to adopt a second reduction strategy (SSV) when the real-time value of the operating speed $\omega_L$ is less than the threshold value $\omega_{TR}$.

It should be noted that in some embodiments, the processing unit 4 is configured for calculating more than a threshold value (for example, two).

Accordingly, in the method for reducing vibrations, the processing unit may decide to adopt:
the first reduction strategy (SST) when the real-time value of the operating speed $\omega_L$ is greater than an upper threshold value;
the second reduction strategy (SSV) when the real-time value of the operating speed $\omega_L$ is less than a lower threshold value;
the first or the second strategy when the real-time value of the operating speed $\omega_L$ is interposed between the lower threshold value and the upper threshold value, as a function of further assessment parameters.

The assessment parameters might, for example, be defined by:
torque and power curve of the mandrel;
structure of lobes diagram (e.g. density of lobes);
range of speed of mandrel.

With reference to the first reduction strategy SST, this strategy is based on a correction of the operating speed $\omega_L$.

In other words, the strategy (also defined as spindle speed tuning) comprises modifying the value of the operating speed $\omega_L$ to a value, higher or lower, considered useful for stabilizing the processing, so as to reduce the vibration which has arisen. With reference to the second reduction strategy SSV, this is based on a continuous modulation which imparts an oscillation to the speed around the real-time value of the operating speed $\omega_L$.

More specifically, according to this strategy (also known as spindle speed variation), the processing unit 4 determines at least a first amplitude value RVA' and a first frequency value RVF' of the modulation wave.

The decision, by the processing unit, on the value of the operating speed or the amplitude RVA and frequency RVF which is able to stabilise the processing may be performed according to a plurality of logics.

Some of the logics may be set up directly by the installer through a user interface module 5 associated with the processing unit 4 and configured to allow the installer to set the control parameters of the first and/or of the second reduction strategy.

The user interface 5 comprises at least one display screen and a data entry unit and is configured to display the operator, through the display screen, at least one data entry panel in which the operator can enter the reference parameters of the control strategy.

These parameters may be inserted by the operator according to the relative experience or, advantageously, by selecting between several sets of pre-set parameters present in a memory 6 of the system 1, associated with the processing unit.

With reference to the memory 6, the processing unit 4 is preferably configured to save in the memory the set of boundary parameters (material, processing, tool, operating speed etc.) and the reduction strategies which have been successful, so that they can be repeated.

Advantageously, in this way the system is able to self-learn and improve its performances even in the absence of an ad hoc programming by the installer.

The system 1 described above is configured to actuate a method for reducing vibrations in a processing for the removal of chippings, which is also the object of the invention, but it does not depend on the system 1 according to the invention.

Figure 2:
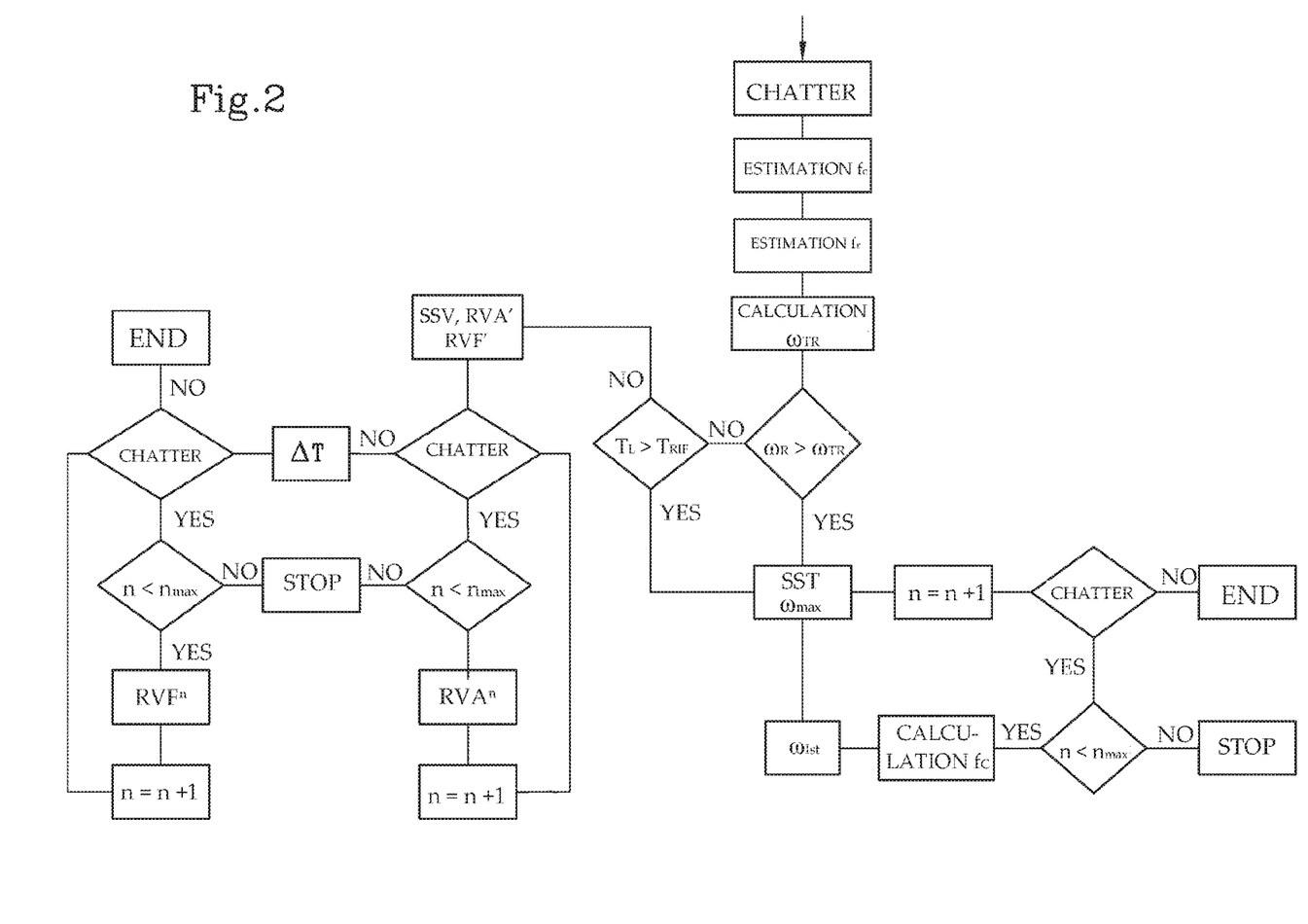
FIG. 2 shows the logic diagram of a preferred embodiment of the method for reducing vibrations according to the invention.

The reduction method comprises the following sequence of steps.

Preferably, the method comprises identifying a processing condition (or the processing started) of the machine 100.

This condition occurs when the tool is completely inserted in the workpiece and the torque and/or operating speed values and/or the advance fall within predetermined intervals or exceed predetermined reference values.

Other conditions or status can be identified, however the method for reduction of the vibrations according to the invention is preferably actuated only during the processing, as the regenerative chatter is a phenomenon precisely of the processing and is to be prevented only during that step.

The vibration which arises from the contact between the tool 103 and a workpiece WP is monitored during to processing.

More specifically, the oscillations occurring in the contact zone are monitored by the sensor means 2 described above.

Preferably, the oscillation of the mandrel 102 and/or the oscillation of the tool 103 is detected.

Any occurrence of a regenerative vibratory phenomenon is then detected as a function of the signal representing the vibration.

More specifically, the method comprises analysing the frequency spectrum of the vibration (that is to say, the signal representing the vibration detected in the time domain by means of the sensor means).

When the vibration monitored has, for example, a frequency content which is not correlated (not associated) with the characteristic frequencies of the process (machine+process), the method detects the occurrence of regenerative vibratory phenomenon.

Alternatively, the vibration may be monitored in terms of amplitude (value at first vibration mode) and/or energy content (integral of a series of samples) and/or maximum value, above a pre-set limit value $V_{TR}$.

At this point, the frequency of the vibratory phenomenon $f_C$ is calculated or identified.

The frequency of the vibratory phenomenon $f_C$ is preferably calculated by transforming the vibration signals in the frequency domain and identifying the frequency value for which there are the greatest amplitudes.

It should be noted that, depending on the type of comparison performed during identification of the vibratory phenomenon, the frequency $f_C$ may already be made available to whoever carries out the method or be calculated in the corresponding step.

There is also, after or simultaneously with the step for identifying the frequency of the vibratory phenomenon $f_C$, a step of estimating a value representing a resonance frequency $f_R$ of the machine.

According to an aspect of the invention, the value representing a resonance frequency $f_R$ is calculated as a function of the frequency of the vibratory phenomenon $f_C$. According to the preferred embodiment, the value representing the resonance frequency $f_R$ of the machine corresponds to the frequency of the vibratory phenomenon $f_C$.

At this point, the method comprises determining at least one threshold value $\omega_{TR}$ of the operating speed.

As already mentioned with regard to the system 1, the determination of the threshold value $\omega_{TR}$ comprises identifying a hypothetical stable speed (operating speed) $\omega_{max}$ and then dividing it by a predetermined coefficient.

According to the preferred embodiment, the stable speed (working) $\omega_{max}$ is calculated as a function of the value of the resonance frequency $f_R$ (or the frequency of the vibratory phenomenon $f_C$).

The first stable speed $\omega_{max}$ is preferably to be considered as a hypothetical maximum stable speed.

The maximum stable speed corresponds, according to the chatter theory, to the stable speed located at the first stability pocket which can be identified in the processing stability diagram (refer to the publications mentioned above for more details).

Preferably, the first stable speed $\omega_{max}$ is calculated using the following formula:

$$\omega_{max} = \frac{f_R \times 60}{n}$$

wherein:
$\omega_{max}$ is the first stable speed
$f_R$ is the estimated resonance frequency
n is equal to the number of cutters of the tool The first stable operating speed $\omega_{max}$ is then divided by a predetermined coefficient in order to calculate the threshold value $\omega_{TR}$.

Preferably, the coefficient is a whole number between 3 and 10, preferably between 4 and 6, more preferably equal to 5.

It should be noted that the threshold value $\omega_{TR}$ divides the range of operating speeds of the machine 100 into at least a first range, which corresponds to low operating speeds, and at least a second range, which corresponds to high operating speeds.

According to an aspect of the invention, the threshold value $\omega_{TR}$ is compared with the value of the real-time operating speed $\omega_L$ (that is, at the moment of the comparison).

This comparison is followed by a step of reducing the actual vibration, which may be performed by selectively adopting the first or the second reduction strategy described above.

More specifically, the reduction step comprises performing a first reduction strategy SST based on a correction of the operating speed $\omega_L$, when the real-time value of the operating speed $\omega_L$) of the mandrel 102 (or of the tool 103) is greater than the threshold value $\omega_{TR}$.

On the other hand, this reduction step comprises performing a second reduction strategy SSV based on a continuous modulation which imparts an oscillation to the speed around the real-time value of the operating speed $\omega_L$, when the operating speed $\omega_L$ is less than the threshold value $\omega_{TR}$.

It should be noted that in some embodiments, the method may comprise the calculation of more than one threshold value (for example, two).

In accordance with this, the reduction strategies are diversified during the step for reducing vibrations.

A solution could be to adopt:
the first reduction strategy SST when the real-time value of the operating speed $\omega_L$ is greater than an upper threshold value;
the second reduction strategy SSV when the real-time value of the operating speed $\omega_L$ is less than a lower threshold value;
the first or the second strategy when the real-time value of the operating speed $\omega_L$ is interposed between the lower threshold value and the upper threshold value, as a function of further assessment parameters.

Reference should be made to the paragraph relative to the system 1 with regard to the application examples of the further assessment parameters.

Preferably, the first reduction strategy SST comprises identifying a hypothetical first stable operating speed $\omega_{1st}$ calculated on the basis of the resonance frequency $f_R$ and the operating speed $\omega_L$ and correction of the operating speed $\omega_L$ to bring it to the hypothetical first stable operating speed $\omega_{1st}$.

More specifically, the method comprises calculating the difference between the real-time operating speed $\omega_L$ and the hypothetical first stable operating speed $\omega_{1st}$, increasing or decreasing the real-time operating speed $\omega_L$ of the difference.

Preferably, the hypothetical first stable operating speed $\omega_{1st}$ is the closest stable operating speed, between the higher ones, to the real-time value of the operating speed $\omega_L$.

Advantageously, in this way the correction of the speed does not affect the productivity of the machine.

However, alternatively, the hypothetical first stable operating speed $\omega_{fst}$ might simply be the stable speed closest to the real-time value of the operating speed $\omega_L$, whether it is higher or lower.

Considering that the hypothetical first stable operating speed $\omega_{fst}$ is, precisely, hypothetical and estimated on the basis of parameters and not an experimental reconstruction of the lobe diagram, the first reduction strategy SST comprises iteratively repeating the steps for identifying a hypothetical further stable operating speed $\omega_{fst}$ and consequent correction of the operating speed $\omega_L$ until reaching a convergence of the vibration below the limit value.

It should be noted that the step for identifying the hypothetical further stable operating speed $\omega_{fst}$ preferably comprises identifying/calculating the new frequency of the vibration $f_C$ arising at the hypothetical first stable operating speed $\omega_{1st}$, to calculating/estimating a new resonance frequency $f_R$ and calculating consequently the hypothetical further stable operating speed $\omega_{fst}$ according to the criteria used in the previous iterations.

Preferably, the iterations are limited to a maximum number, more preferably between five and ten.

In other words. the identification and correction steps are repeated iteratively for a predetermined maximum number of iterations.

If the number of iterations is exceeded, the method preferably comprises stopping the reduction step, at least in the performance of the first strategy SST.

The second reduction strategy SSV comprises, on the other hand, a continuous modulation which imparts an oscillation (along a modulation wave) of the operating speed ωL around its real-time value (i.e. value at the time of the measurement), which defines the average value of the modulation wave used.

It should be noted that the expression "modulation wave" is used in this text to include harmonic waves of any type.

However, preferably, the modulating wave used in this method has a sinusoidal or triangular trend.

Preferably, the second reduction strategy comprises determining an amplitude RVA and a phase or frequency RVF of the wave proportional to the operating speed $\omega_L$. Preferably, the amplitude RVA and the phase or frequency RVF are normalized (dimensionless) at the operating speed $\omega_L$ (in that sense, proportional to it).

Preferably, the amplitude RVA of the wave is determined as a function of the operating speed $\omega_L$.

According to the preferred embodiment, the amplitude values RVA are between 5% and 40% of the operating speed $\omega_L$.

According to an embodiment, the amplitude RVA is determined in such a way that the oscillation speed, with average value equal to or close to the operating speed $\omega_L$, goes in at least two zones, preferably end zones, to enclose a stability pocket of the hypothetical lobe diagram constructed on the frequency of the vibratory phenomenon $f_C$.

Preferably, the phase value RVF is selected in a range of between 0.5 and 5 Hz, preferably about 1 Hz.

According to the preferred embodiment, however, the phase (or frequency) RVF of the wave is also determined as a function of the operating speed $\omega_L$.

Preferably, the phase values RVF are between 5% and 30% of the operating speed $\omega_L$.

More specifically, the second reduction strategy SSV comprises determining a first amplitude value RVA' and a first phase or frequency value RVF' as a function of the operating speed $\omega_L$.

Once the first amplitude RVA' and phase RVF' values have been determined, a first modulation (implementation of the SSV) of the operating speed $\omega_L$ is performed according to the corresponding modulation wave.

The second reduction strategy then comprises, after the (first) continuous modulation of the operating speed $\omega_L$, monitoring again the vibration which arises from the contact between the tool and the workpiece.

If the vibration in the zone of contact, meaning, for example, the intensity or amplitude of the vibration or the asynchronous frequencies, remains substantially constant or increases in intensity after the first modulation, the second reduction strategy SSV comprises varying the amplitude RVA determining a second amplitude value RVA" in accordance with a predetermined logic.

According to the preferred embodiment, the second amplitude value RVA" is greater than the amplitude value RVA initially determined.

At this point, the speed is modulated (for example, varied in a sinusoidal fashion) with amplitude equal to the second amplitude value RVA" and phase equal to the frequency RVF determined initially.

Preferably, as mentioned above with regard to the first reduction logic SST, also in this case the steps of monitoring and variation of the amplitude are repeated iteratively for a predetermined maximum number times.

Thus, in the absence of a positive response to the first amplitude variations RVA, the second control strategy SSV comprises varying further the amplitude value RVA$^n$, where n corresponds to the iteration.

On the other hand, if in response to the first variation (or a variation subsequent to those provided by the above iterations) the vibration in the contact zone decreases (for example, below the limit value $V_{TR}$), then the amplitude RVA$^n$ is kept unchanged relative to the last variation for a predetermined interval of time.

In this the regard, the method preferably comprises monitoring again the vibration which arises in the contact zone between the tool 103 and the workpiece WP for at least the interval of time ΔT; when a new increase in the vibration (in terms of energy intensity or maximum values or presence of asynchronous frequencies) is detected within the time interval ΔT, then the second reduction strategy SSV comprises modifying the frequency RVF of the modulation wave, determining at least a second frequency value RVF".

Thus, the second reduction strategy SSV comprises varying the frequency RVF of the modulation wave when, after the predetermined period of time ΔT, the vibration in the contact zone increases again.

The interval of time ΔT preferably has a duration of between 0.3 and 0.8 [s].

It should be noted that the method might comprise, instead of a predetermined interval in terms of time, identification of a maximum number of samples.

At this point, the operating speed $\omega_L$ is modulated again according to the new modulation wave with amplitude RVA" and phase or frequency RVF".

In other words, when a significant pulse is detected in the vibration, the second reduction strategy SSV changes the control logic, varying the frequency RVF and leaving the amplitude RVA unaltered.

Thus, when a "fast" increase is detected in the intensity of the vibratory phenomenon following a relative reduction determined by the adoption of the continuous modulation with amplitude RVA", the second reduction strategy identifies the variation of the frequency RVF of the wave.

Preferably, the frequency variations RVF and the consequent monitoring are also repeated iteratively for a predetermined number of times.

Thus, in the absence of a positive response to the first frequency variations RVF", the second control strategy SSV comprises varying further the frequency amplitude value RVF$^n$ where n corresponds to the iteration.

It should be noted that the second reduction strategy comprises blocking the amplitude and frequency values of the continuous modulation wave of the speed when the steps for varying the amplitude value RVA" and/or the frequency value RVF" of the modulation wave are repeated for a predetermined maximum number of iterations, preferably between five and ten.

According to a first embodiment, the amplitude and frequency values of the wave modulation are locked/fixed to the last available values (values of the last iteration).

Alternatively, the amplitude and frequency values could be set up for which the vibration of lower intensity had been previously detected.

It should be noted that, irrespective of the number of threshold values, the method preferably comprises performing a verification step after the comparison step described above.

For example, a verification step is preferably performed if the second reduction strategy SSV is adopted.

In fact, according to the preferred embodiment, the preliminary verification step comprises comparing the real-time operating torque value $T_L$ of the mandrel 102 with a reference value representing the maximum torque value deliverable by the mandrel 102.

Preferably, the reference value preferably identifies the maximum torque reduced by a predetermined safety coefficient.

According to the preferred embodiment, if the comparison shows that the real-time operating torque value $T_L$ exceeds the reference value, the method comprises adopting the first reduction strategy SST in place of the second SSV.

Advantageously, this makes it possible to limit the applications of the second reduction strategy merely to the processing operations in which the available torque is sufficient.

The invention achieves the above mentioned aims and has important advantages.

In effect, the preparation of a system and a method which allows the autonomous selection of the best strategy for reducing vibrations as a function of the type of processing is very efficient and robust.

In fact, the self-adapting capacity of the system, which is also able in some embodiments to learn autonomously from the results of the previous processing, increases both the robustness of the system to any errors during the initial phase and, consequently, its efficiency.

Moreover, as they do not require manual intervention by the operator (except during installation) or experimental tests aimed at determining the specific lobe diagram for the processing, the method and the system are considerably higher performing and versatile than those of the prior art.

The invention claimed is:

1. A method for reducing vibrations originating from a mechanical processing for removing swarf, the mechanical processing being carried out by a machine tool having a mandrel rotating at a relative operating speed on which is mounted a cutting tool having one or more cutting edges defining a plurality of characteristic frequencies of the machine tool, the method comprising the following steps:
    monitoring a vibration which arises from a contact between the cutting tool and a workpiece;
    measuring an occurrence of a regenerative vibratory phenomenon when the vibration exceeds a pre-set limit value or has a frequency content which is not related to the characteristic frequencies;
    calculating a frequency of the vibratory phenomenon;
    estimating a value representing a resonance frequency of the machine tool as a function of the frequency of the vibratory phenomenon;
    determining a threshold value based on the value representing the resonance frequency;
    comparing between a real-time value of the operating speed of the mandrel and the threshold value;
    reducing an intensity of the vibratory phenomenon by an execution of:
        a first reduction strategy based on a modification of the operating speed when the real-time value of the operating speed of the mandrel is greater than the threshold value;
        a second reduction strategy based on a continuous modulation which imparts an oscillation to the operating speed about the real-time value, when the real-time value of the operating speed of the mandrel is less than the threshold value.

2. The method for reducing vibrations according to claim 1, wherein the determining the threshold value comprises:
    calculating a hypothetical stable operating speed as a function of the resonance frequency of the machine tool;
    dividing the stable operating speed by a predetermined coefficient, in order to calculate the threshold value; the threshold value dividing a range of operating speeds of the machine tool into at least a first range, which corresponds to low operating speeds, and at least a second range, which corresponds to high operating speeds.

3. The method for reducing vibrations according to claim 1, wherein the value representing the resonance frequency of the machine tool corresponds to the frequency of the vibratory phenomenon.

4. The method for reducing vibrations according to claim 1, wherein the second reduction strategy comprises:
    determining a first amplitude value and a first frequency value of a modulation wave proportional to the operating speed;
    performing a first modulation of the operating speed by oscillating the first amplitude value and/or the first frequency value of the modulation wave.

5. The method for reducing vibrations according to claim 4, wherein the second reduction strategy comprises, after the first continuous modulation of the operating speed, monitoring again the vibration which arises by the contact between the cutting tool and a workpiece being processed and:
   determining a second amplitude value of the modulation wave and carrying out a second continuous modulation of the operating speed according to the modulation wave if the vibration in the contact zone remains substantially constant or increases in intensity following the first modulation;
   maintaining unaltered the amplitude value of the modulation wave for a predetermined time interval if the vibration in the contact zone decreases below the limit value in response to the first modulation.

6. The method for reducing vibrations according to claim 5, wherein the second reduction strategy comprises:
   determining a second frequency value of the modulation wave when, after the predetermined time interval, the vibration in the contact zone increases again above the limit value or has a frequency content which is not related to the characteristic frequencies;
   performing a further variation of the operating speed according to the modulation wave having a frequency equal to the second value.

7. The method for reducing vibrations according to claim 4, and further comprising a step of locking the first amplitude and frequency values of the modulation wave when the steps of oscillating the first amplitude value and/or the first frequency value modulation wave are repeated for a predetermined maximum number of iterations.

8. The method for reducing vibrations according to claim 1, wherein the mandrel of the machine tool has a respective value of respective torque or maximum power; the second reduction strategy comprising a step of preliminary checking wherein:
   a working torque or a power of the mandrel is compared with a reference value representing the torque or maximum power;
   the reduction strategy is modified from the second strategy to the first reduction strategy if a value of the working torque or the power is greater than the reference value.

9. The method for reducing vibrations according to claim 1, wherein the first reduction strategy comprises performing the following steps:
   identifying a hypothetical first stable operating speed calculated on a basis of the resonance frequency and of the operating speed;
   modifying the operating speed to change the real-time value to the hypothetical first stable operating speed.

10. The method for reducing vibrations according to claim 9, wherein the first reduction strategy comprises repeating iteratively the identifying and modifying steps until a convergence of the vibration measures below the limit value.

11. The method for reducing vibrations according to claim 9, wherein the identifying and modifying steps are repeated iteratively for a predetermined maximum number of iterations.

12. The method for reducing vibrations method according to claim 11, wherein the modifying step is stopped when the maximum number of iterations is exceeded.

13. A system for reducing vibrations for a machine tool, comprising:
   a sensor configured for monitoring a vibration which arises from a contact between a cutting tool and a workpiece being processed and providing a signal representing the vibration;
   an interface configured to be placed in communication with a control unit of the machine tool;
   a processing unit operatively connected with the sensor and the interface to exchange signals with the sensor and the interface and configured for:
   comparing the signal representing the vibration with one or more pre-set reference parameters;
   activating a method of reducing the vibration if the signal representing the vibration exceeds one or more pre-set reference parameters;
   wherein at least one chosen from the interface and the processing unit is configured for:
   calculating a frequency of the vibration;
   estimating a value representing a resonance frequency of the machine tool as a function of the frequency of the vibration;
   determining a threshold value based on the value representing the resonance frequency;
   comparing a real-time value of an operating speed of a mandrel of the machine tool with the threshold value;
   adopting a first reduction strategy based on a modification of the operating speed when the real-time value of the operating speed of the mandrel is greater than the threshold value,
   adopting a second reduction strategy based on a continuous modulation which imparts an oscillation to the operating speed about the real-time value, when the real-time value of the operating speed of the mandrel is less than the threshold value.

14. The system for reducing vibrations according to claim 13, and further comprising a user interface module operatively connected with the processing unit and configured for allowing a user to enter control parameters of the first reduction strategy and the second reduction strategy.

15. The system for reducing vibrations according to claim 14, wherein the control parameters comprise one or more of the following:
   an initial amplitude of a modulation wave according to which the operating speed is varied in the second reduction strategy;
   an initial frequency of the modulation wave according to which the operating speed is varied in the second reduction strategy;
   a criterion for selecting a hypothetical first stable operating speed to be adopted in the first reduction strategy, to be selected between a stable operating speed immediately lower than the real-time value of the operating speed and a stable operating speed immediately higher than the real-time value.

16. The system for reducing vibrations according to claim 14, wherein the processing unit is configured for comparing together the signals received from the sensor and/or from the interface in order to identify, as a function of the comparison, at least one processing condition started; the processing unit being configured for activating the method for reducing vibrations only when the processing condition started is identified.

17. The system for reducing system vibrations according to claim 13, wherein the sensor comprises:
   an accelerometer, operatively connected with the mandrel of the machine tool and configured for identifying the vibration which is transmitted by the cutting tool to the mandrel;
   a microphone positioned at a predetermined distance from the cutting tool so as to pick up the vibration of the cutting tool.

18. A machine tool comprising:
the system for reducing vibrations according to claim 13;
a part holding device;
wherein the mandrel is configure to rotate at a respective operating speed and to mount the cutting tool such that the cutting tool is movable towards and away from the part holding device according to one or more working axes;
a control unit;
wherein the interface is connected to the control unit.

* * * * *